Figure 1:
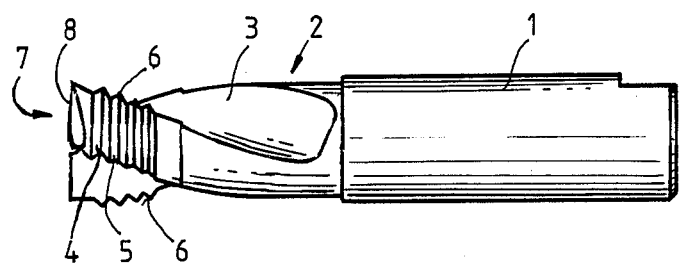

United States Patent [19]

Schmitt

[11] Patent Number: 4,943,191
[45] Date of Patent: Jul. 24, 1990

[54] DRILLING AND THREAD-MILLING TOOL AND METHOD

[76] Inventor: M. Norbert Schmitt, Schwalbenweg 3, D-8501 Feucht, Fed. Rep. of Germany

[21] Appl. No.: 396,449

[22] Filed: Aug. 18, 1989

[30] Foreign Application Priority Data

Aug. 25, 1988 [DE] Fed. Rep. of Germany ....... 3828780

[51] Int. Cl.$^5$ ................................................ B23G 5/20
[52] U.S. Cl. ..................... 408/1 R; 10/140; 10/141 R; 408/222; 409/74
[58] Field of Search ............. 10/140, 141 R; 408/118, 408/222, 230, 1; 411/386, 387; 409/65, 66, 74, 77

[56] References Cited

U.S. PATENT DOCUMENTS

| | | | |
|---|---|---|---|
| 1,288,893 | 12/1918 | Holmes | 10/140 X |
| 2,369,273 | 2/1945 | Bakewell | 408/222 |
| 2,479,730 | 8/1949 | Dewar | 10/140 X |
| 4,761,844 | 8/1988 | Turchan | 408/222 X |
| 4,831,674 | 5/1989 | Bergstrom et al. | 408/222 X |

FOREIGN PATENT DOCUMENTS 24758 of 1899 United Kingdom ................... 10/140

Primary Examiner—E. Michael Combs
Attorney, Agent, or Firm—Toren, McGeady & Associates

[57] ABSTRACT

A drilling and thread-milling tool is disclosed which has at its front-end 7 at least one end-cutting edge 8 for making a core-diameter hole and, behind it, non-pitched thread-milling teeth 4 to generate thread pitches and for which are provided an axial motion, rotation about its own axis as well as a helical motion. It is desirable that one tool should be adapted for making core-diameter holes of different diameters essentially by means of the end-cutting edge. This is accomplished in as much as the outer diameter of the end-cutting edge 8 is equal to or smaller than the minor diameter of the thread-milling teeth 4, in that the number of thread-milling teeth 4 arranged in axial succession is less than the number of thread pitches to be produced, in that provision is made for the simultaneous cutting of the core-diameter hole and thread pitches and in that the helical motion serving to generate the thread pitches consists of a number of orbits corresponding to the number of thread pitches to be generated. The drilling and thread-milling tool enables core-diameter holes of different diameters to be made with the same end-cutting edge because machining of the core-diameter hole is effected during the helical motion.

3 Claims, 2 Drawing Sheets

DRILLING AND THREAD-MILLING TOOL AND METHOD

DESCRIPTION

This invention relates to a drilling and thread-milling tool which is formed at its forward end with at least one end cutting edge to produce a core-diameter hole and behind this with pitch free or lead free thread-milling teeth to produce thread pitches and for which are provided an axial motion, rotation about its own axis as well as a helical motion of its own axis.

In a prior art (International OS WO No. 87/05546) drilling and thread-milling tool of this type, the outer diameter of the end cutting edge is equal to or greater than the outer diameter of the thread-milling teeth, the number of thread-milling teeth arranged behind each other in the axial direction is at least equal to the number of thread pitches to be produced, provision is made for first making the core-diameter hole and subsequently making the thread pitches and the helical motion comprises roughly only one orbit, i.e. less than 2 orbits. The prior-art drilling and thread-milling tool produces a threaded hole whose minor diameter is equal to the outer diameter of the end-cutting edge. If it is desired to make core-diameter holes of differently sized diameters by means of the end-cutting edge, it is necessary to stock a selection of different drilling and thread-milling tools with corresponding end-cutting edge diameters and to exchange these on the machine tool on which the drilling and thread-milling tool is used.

It is an object of the present invention to provide a drilling and thread-milling tool of the type initially referred to which permits the use of a single tool for making core-diameter holes of different diameters substantially with the same end-cutting edge. In accomplishing this task, the drilling and thread-milling tool according to the invention is characterized in that the outer diameter of the end-cutting edge is equal to or less than the minor diameter of the thread-milling teeth, that the number of thread-milling teeth arranged behind each other in the axial direction is less than the number of thread pitches to be produced, in that the core-hole and thread pitches are produced simultaneously and in that the helical motion serving to produce the thread pitches consists of a number of orbits corresponding to the number of thread pitches to be produced.

The drilling and thread-milling tool according to the invention which is characterized by its form and its motion in producing a threaded hole enables core-diameter holes of different diameters to be made with the same end-cutting edge since cutting of the core-diameter hole is effected during the helical motion which serves to make the thread pitches or turns, that is one complete revolution of the thread. It is possible without changing the tool to make two threaded holes of different minor diameters in succession which affords a time-saving. The core-diameter hole is substantially made by the one end-cutting edge—but is not limited to one—which is better adapted on account of its strength for the cutting of the core-diameter hole material than are the thread-milling teeth. The drilling and thread-milling tool according to the invention needs only a reduced number of thread-milling teeth in axial succession and, therefore, is of a simplified design and has a shorter profiled length.

If the outer diameter of the end-cutting edge at the end of the tool is smaller than the minor diameter of the thread-milling teeth, core-diameter hole material will also be removed by the edge at a step ahead of the front thread-milling tooth. Generally, the outer diameter of the end-cutting edge would be equal to the minor diameter of the thread-milling teeth.

If the drilling and thread-milling tool according to the invention is formed with two or more thread-milling teeth of identical construction arranged in axial succession, only the foremost thread-milling tooth would be loaded in making the thread pitches. It is especially desirable and advantageous, therefore, that forward thread-milling teeth arranged in axial succession be formed with some pointing or tapering inwardly toward the end-cutting edge. As in the case of a drill tap, several of the forward thread-milling teeth will then cooperate in making the thread pitches or turns.

The drilling and thread-milling tool according to the invention generally has two end-cutting edges, of which, for instance, one will end ahead of the centerline and the other extend beyond the centerline. Alternatively, there may be more than two or only one end-cutting edge. The end-cutting edge may, for instance, extend in a plane at right angles to the centerline; also it is conceivable that the free end of the drilling and thread-milling tool is formed with a pointed shape.

The rotation of the drilling and thread-milling tool about its own axis is so fast that the end-cutting edge and, respectively, the thread-milling tooth cuts or machines the thread despite the helical motion. When, during the helical motion, the drilling and thread-milling tool performs an orbit of 360°, that is, one complete orbit, it will be advanced in the axial direction by a 360° pitch of the helix of the thread pitches; i.e. the feed of the drilling and thread-milling tool corresponds to the pitch of the thread to be generated.

The diameter of the core-diameter hole to be produced in one operation by the end-cutting edge may be up to twice as large as the diameter of the end-cutting edge, due to the helical motion of the tool. It is possible, in certain circumstances, also to start a second operation and to remove core-diameter hole material again with an increased radius of the helical motion while producing thread pitches. If, during a first operation, the diameter of the helical motion is greater than twice the diameter of the end-cutting edge, there will be a pip remining at the center with an exteranal thread but, despite of this, the internal thread of the hole will have been generated.

The drilling and thread-milling tool according to the invention will be used on a mechanically controlled machine tool or, as a rule, a numerically controlled machine tool equipped with three-axis control which permits helical plunging of the tool into the workpiece, an orbital motion being superimposed on an axial advancing motion. At the start of the plunge motion, only the end-cutting edge is effective. As soon as this has entered the workpiece, the thread-milling tooth will come into action additionally. The helical motion comprises at least as many orbits as there are thread pitches to be produced. Once the threaded tool has been completed, the drilling and thread-milling tools will return to the centerline of the threaded hole to be retracted.

Figure 2:
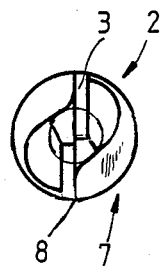
Figure 3:
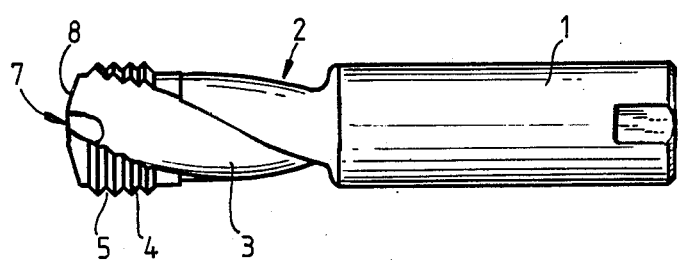
Figure 4:
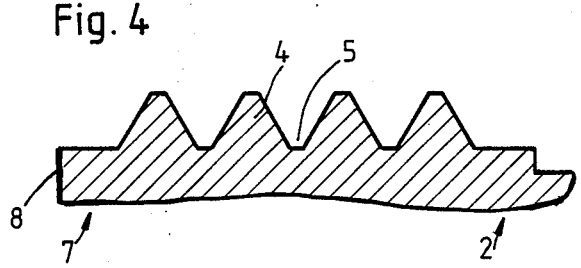
Figure 5:
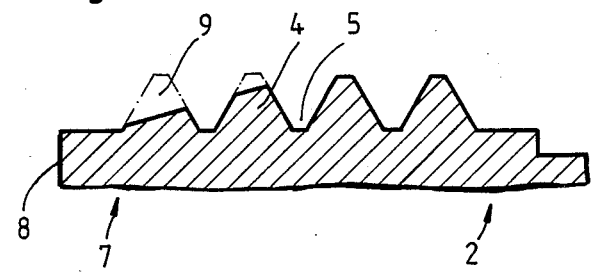

Preferred embodiments of the invention are illustrated in the acccompanying drawing in which FIG. 1 is a side elevation of a drilling and thread-milling tool, FIG. 2 is a front end view of the drilling and end milling tool shown in FIG. 1, FIG. 3 is another side elevation of the drilling and thread milling tool shown in FIG. 1, FIG. 4 is a longitudinal section through part of the drilling and thread-milling tool shown in FIG. 1 drawn on an enlarged scale compared to FIG. 1, FIG. 5 is a longitudinal section through part of another drilling and thread-milling tool.

Figure 6:
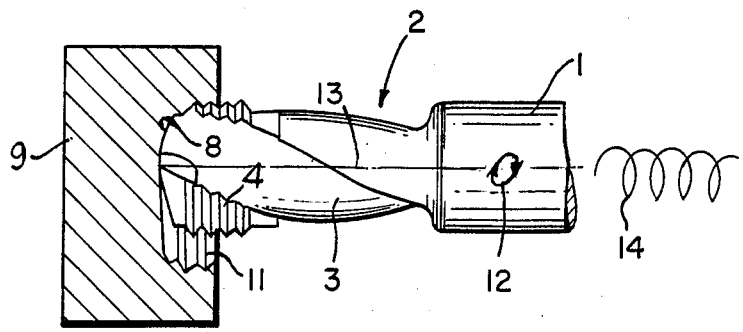
Figure 7:
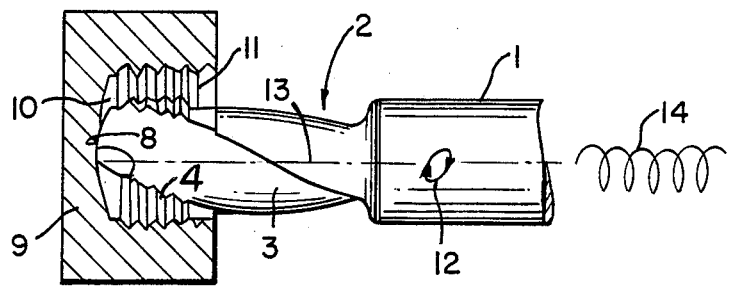
Figure 8:
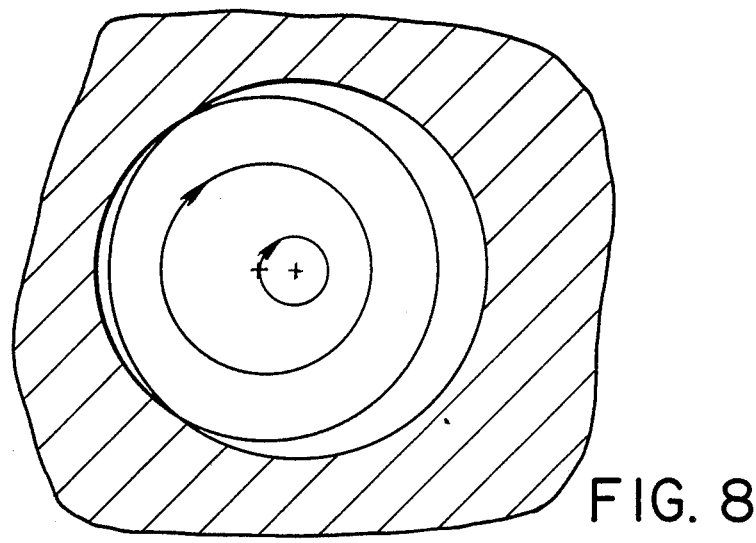

FIG. 6 is a elevational view of the drilling and thread-milling tool of FIG. 1 drilling a thread in a workpiece, FIG. 7 is a side elevational view similar to FIG. 6, however, showing the tool at the complementation of forming the threaded hole, and FIG. 8 is a schematic view of the drilling and thread-milling tool illustrating the different movements of the tool.

The drilling and thread-milling tool shown in FIGS. 1–4 is formed at its rear end with a shank 1 for insertion in the chuck of a machine-tool spindle. Adjoining to the shank 1 towards the front is a milling region 2 which is provided with two helical flutes 3 and two rows of four thread-cutting teeth 4 in succession, the rows extending in an axial direction between the flutes 3. The teeth 4 are free of any lead or incline relative to the tool axis; or rather in a helical direction. The thread-milling teeth 4 each delimit a flute 5 between each other and form thread-milling edges 6. The drilling and thread-milling tool terminates at its front end with an end portion 7 which is provided with end-cutting edges 8 which, initially, extend in a plane at right angles to the centerline and then after a sharp bend pass on a fictitious cylindrical surface into lateral cutting edges which also cooperate in producing the core-diameter hole.

As shown in FIG. 4, the thread-milling teeth 4 arranged in a row are of equal size and shape. Since only the foremost tooth in FIG. 4 performs cutting work, the other teeth only serve to provide guidance. When the front tooth has been worn down, it may be ground off, whereupon the next tooth in the row will perform the cutting work. As shown in FIG. 5, pointing, chamfering or tapering 9 is provided extending over the first two thread-milling teeth 4 closer to the end portion 7, so that the first three teeth 4 in the row are made to perform cutting work in producing one thread.

In FIG. 6 drilling and thread-milling tool of FIGS. 1–3 is shown drilling a threaded hole or bore 10 with a thread 11 in a workpiece 9. The tool rotates around its central axis 13 according to the arrow 12. In addition, the axis 13 of the tool travels around a helical path 14. During movement around the helical path the cutting edge 8 and the thread-cutting teeth 4 cut the threaded bore 10. While there are four thread-cutting teeth 4 arranged one behind the other in the axial direction, the thread 11 in the completed threaded bore 10 has five thread turns.

I claim:

1. An axially extending drilling and thread-milling tool for forming a threaded bore and having a front end and a rear end spaced apart in the axial direction, an axially extending shank extending from the rear end toward the front end and arranged to be inserted into a driving means, at least one end cutting edge at the front end and extending perpendicularly of the tool axis and spaced from said shank, a milling region extending axially between said shank and said end cutting edge, a plurality of lead free thread milling teeth formed in said milling region and spaced apart in the axial direction, said thread milling teeth arranged to form a helical thread in the bore, said end cutting edge having a radius extending outwardly from the axis of said tool, said thread milling teeth having a minor radius equal to or greater than the radius of said end cutting edge, the number of said thread milling teeth being less than the number of thread turns to be formed, said driving means arranged to drive said drilling and thread milling tools so that the axis thereof moves axially, rotationally and along a helical path for forming the core diameter hole in threads inclined relative to the tool axis, the number of thread turns corresponds to the number of orbits traversed in the movement along the helical path.

2. An axially extending drilling and thread-milling tool, as set forth in claim 1, wherein each said thread milling teeth each has a radially outer end, and the radially outer ends of said teeth closer to end cutting edge tapering inwardly toward the tool axis from the radially outer end of at least the tooth closer to said shank.

3. A method of drilling a threaded bore in a workpiece by mounting an axially extending drilling and thread milling tool in a machine tool spindle for moving the milling tool axially, rotationally and along a helical path about the axis of the milling tool, providing an end cutting edge on a front end of the milling tool followed toward a rear end of the milling tool by lead free thread milling teeth extending transversely of the milling tool axis, moving the milling tool axially, rotationally and along a helical path into the workpiece for initially cutting a core hole and then producing thread turns, moving the milling tool around a plurality of orbits along the helical path and after completing the threaded bore, moving the milling tool axially out of the threaded bore, wherein the improvement comprises forming the end cutting edge with a radial dimension equal to or less than a minor diameter of the thread milling teeth, spacing the milling teeth apart in the axial direction of the milling tool, moving the milling tool axially, rotationally and along the helical path for simultaneously forming the core hole and the thread turns, and moving the milling tool along the helical path for a number of orbits around the path corresponding to the number of thread turns formed.

* * * * *